US011624710B2

(12) United States Patent
Yoo et al.

(10) Patent No.: US 11,624,710 B2
(45) Date of Patent: Apr. 11, 2023

(54) FAST IMAGE ACQUISITION SYSTEM AND METHOD USING PULSED LIGHT ILLUMINATION AND SAMPLE SCANNING TO CAPTURE OPTICAL MICROGRAPHS WITH SUB-MICRON FEATURES

(71) Applicant: Lawrence Livermore National Security, LLC, Livermore, CA (US)

(72) Inventors: Jae Hyuck Yoo, Livermore, CA (US); Eyal Feigenbaum, Livermore, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 598 days.

(21) Appl. No.: 16/421,710

(22) Filed: May 24, 2019

(65) Prior Publication Data

US 2020/0371044 A1 Nov. 26, 2020

(51) Int. Cl.
*G01N 21/88* (2006.01)
*H04N 5/235* (2006.01)
(Continued)

(52) U.S. Cl.
CPC ..... *G01N 21/8851* (2013.01); *G01N 21/8806* (2013.01); *G02B 21/00* (2013.01);
(Continued)

(58) Field of Classification Search
CPC .. G01N 21/658; G01N 33/582; G01N 33/587; G01N 21/47; G01N 21/88;
(Continued)

(56) References Cited

U.S. PATENT DOCUMENTS

| 6,653,651 B1 * | 11/2003 | Meinhart | G01F 1/712 |
| | | | 250/356.2 |
| 2009/0030630 A1 * | 1/2009 | Eitan | G01N 21/9501 |
| | | | 702/81 |

(Continued)

FOREIGN PATENT DOCUMENTS

| CN | 1621775 A | * | 6/2005 | ........... G02B 21/244 |
| CN | 105651785 A | * | 6/2016 | |

(Continued)

OTHER PUBLICATIONS

Laurence, Ted A. et al. "Metallic-like photoluminescence and absorption in fused silica surface flaws", Appl. Phys. Lett. 94, 151114 (2009); https://doi.org/10.1063/1.3119622, Submitted: Feb. 13, 2009, Accepted: Mar. 25, 2009, Published Online: Apr. 17, 2009, 4 pages.

*Primary Examiner* — Michael P Stafira
(74) *Attorney, Agent, or Firm* — Harness, Dickey & Pierce, P.L.C.

(57) ABSTRACT

An optical inspection system for detecting sub-micron features on a sample component. The system may have a controller, a camera responsive to the controller for capturing images, an objective lens able to capture submicron scale features on the sample component, and a pulsed light source. The pulsed light source may be used to generate light pulses. The camera may be controlled to acquire images, using the objective lens, only while the pulsed light source is providing light pulses illuminating a portion of the sample component. Relative movement between the sample component and the objective lens is provided to enable at least one of a desired subportion or an entirety of the sample component to be scanned with the camera.

19 Claims, 7 Drawing Sheets

(51) Int. Cl.
*G06T 3/40* (2006.01)
*G02B 21/36* (2006.01)
*G02B 21/00* (2006.01)
*G02B 21/06* (2006.01)
*G02B 21/18* (2006.01)

(52) U.S. Cl.
CPC ....... *G02B 21/008* (2013.01); *G02B 21/0032* (2013.01); *G02B 21/06* (2013.01); *G02B 21/18* (2013.01); *G02B 21/36* (2013.01); *G06T 3/4038* (2013.01); *H04N 5/2354* (2013.01); *G01N 2201/068* (2013.01); *G01N 2201/0696* (2013.01); *G01N 2201/102* (2013.01)

(58) Field of Classification Search
CPC ............... G01N 21/554; G01N 21/648; G01N 33/0031; G01N 27/127; G01N 2223/3037; G01N 33/004; G01N 2021/6439; G01N 21/6486; G01N 15/1475; G01N 2015/1006; G01N 33/0037; G01N 33/0042; G01N 33/0044; G01N 33/0047; G01N 33/0049; G01N 33/005; G01N 33/0054; G01N 33/0057; G01N 33/588; G01N 2015/1497; G01N 2223/102; G01N 1/32; G01N 2021/656; G01N 21/64; G01N 21/65; G01N 35/00; G01N 15/147; G01N 2015/149; G01N 2021/6482; G01N 21/25; G01N 21/6428; G01N 27/3278; G01N 27/4146; G01N 15/14; G01N 15/1459; G01N 2015/0038; G01N 2015/1493; G01N 21/21; G01N 21/63; G01N 21/6452; G01N 21/6456; G01N 21/6489; G01N 24/12; G01N 33/585; G01N 35/10; G01N 1/286; G01N 1/44; G01N 15/1484; G01N 2035/00326; G01N 2223/303; G01N 23/04; G01N 23/205; G01N 23/225; G01N 23/2251; G01N 27/12; G01N 33/44; G01N 35/1065; G01N 15/1425; G01N 2015/1472; G01N 2021/6432; G01N 2035/00158; G01N 2035/0429; G01N 2035/1051; G01N 21/01; G01N 21/6458; G01N 21/8806; G01N 21/8851; G01N 2201/06113; G01N 2201/068; G01N 2223/076; G01N 23/02; G01N 23/223; G01N 23/2254; G01N 33/006; G01N 33/4833; G01N 33/48721; G01N 33/5005; G01N 33/5014; G01N 33/5061; G01N 33/533; G01N 33/54313; G01N 1/30; G01N 1/405; G01N 1/4077; G01N 1/42; G01N 15/0227; G01N 15/0272; G01N 15/1468; G01N 2015/0088; G01N 2021/0346; G01N 2021/1714; G01N 2021/6441; G01N 2021/8822; G01N 2021/8838; G01N 2021/8896; G01N 2021/95615; G01N 2035/00881; G01N 2035/1076; G01N 21/05; G01N 21/171; G01N 21/23; G01N 21/55; G01N 21/645; G01N 21/9501; G01N 21/956; G01N 21/95607; G01N 2201/0696; G01N 2201/102; G01N 2223/071; G01N 2223/08; G01N 23/20058; G01N 23/2206; G01N 2333/96433; G01N 2333/96466; G01N 2333/974; G01N 2800/52; G01N 33/48; G01N 33/53; G01N 33/54346; G01N 33/54373; G01N 33/56911; G01N 33/57434; G01N 33/57449; G01N 33/57488; G01N 33/57496; G01N 33/68; G01N 33/6845; G01N 33/92; G01N 35/0092; G01N 35/0099; G01N 1/312; G01N 2035/00049; G01N 2035/00138; G01N 2035/0441; G01N 2035/0462; G01N 2035/0493; G01N 15/0205; G01N 2015/1486; G01N 15/0211; G01N 15/1463; G01N 35/00069; G01N 21/1702; G01N 2201/08; G01N 2021/1725; G01N 21/1717; G01N 35/025; G01N 2021/1706; G01N 2035/00247; G01N 21/4795; G01N 2201/0846; G01N 2223/611; G01N 2001/2886; G01N 21/95684; G01N 21/0303; G01N 21/45; G01N 21/59; G01N 21/85; G01N 2001/028; G01N 2001/045; G01N 2015/025; G01N 2021/1787; G01N 2021/458; G01N 2021/4707; G01N 2021/4709; G01N 2021/4742; G01N 2021/8825; G01N 21/35; G01N 21/53; G01N 21/94; G01N 21/95623; G01N 2201/0691; G01N 2201/12; G01N 2291/02827; G01N 2291/02881; G01N 2291/0426; G01N 2291/0427; G01N 2333/705; G01N 2800/2835; G01N 2800/2842; G01N 2800/302; G01N 29/0681; G01N 29/2418; G01N 33/48728; G01N 33/502; G01N 33/5023; G01N 33/5058; G01N 33/5091; G01N 33/5438; G01N 33/561; G01N 33/569; G01N 33/58; G01N 33/6872; G01N 1/22; G01N 2021/1731; G01N 2021/479; G01N 2021/655; G01N 21/00; G01N 21/3563; G01N 21/552; G01N 21/636; G01N 23/20091; G01N 23/207; G01N 33/551; G01N 35/1097; G01N 1/24; G01N 15/1434; G01N 2001/022; G01N 2001/245; G01N 2015/1075; G01N 2021/1757; G01N 2021/1765; G01N 2021/8592; G01N 21/41; G01N 21/76; G01N 2201/0221; G01N 2201/0612; G01N 25/72; G01N 33/5029; G01N 33/60; G02B 21/367; G02B 27/58; G02B 21/0032; G02B 21/365; G02B 21/002; G02B 21/0048; G02B 21/008; G02B 21/06; G02B 21/086; G02B 21/16; G02B 21/0056; G02B 21/006; G02B 21/084; G02B 21/125; G02B 21/361; G02B 2207/101; G02B 27/106; G02B 27/1066; G02B 27/46; G02B 6/0073; G02B 6/122; G02B 21/34; G02B 5/3033; G02B 5/3083; G02B 6/0038; G02B 21/00; G02B 21/10; G02B 21/12; G02B 5/00; G02B 21/26; G02B 21/245; G02B 21/0036; G02B 21/22; G02B 21/36; G02B 13/0025; G02B 13/006; G02B 13/0085; G02B 27/0025; G02B 3/0025; G02B 3/0031; G02B 3/0068; G02B 3/0075; G02B 7/022; G02B 17/08; G02B 27/02; G02B 21/0076; G02B 21/244; G02B 21/0024; G02B 21/0084; G02B 21/24; G02B 26/101; G02B 26/105; G02B 21/18;

G02B 7/38; G02B 19/0014; G02B 19/0052; G02B 21/0028; G02B 21/0052; G02B 21/0064; G02B 21/0072; G02B 21/08; G02B 2207/114; G02B 27/0081; G02B 27/0955; G02B 30/50

See application file for complete search history.

(56) References Cited

U.S. PATENT DOCUMENTS

| | | | | |
|---|---|---|---|---|
| 2009/0323052 | A1* | 12/2009 | Silberstein | G01N 21/95623 356/237.5 |
| 2010/0053599 | A1* | 3/2010 | Milster | G01J 3/2823 356/51 |
| 2014/0128743 | A1* | 5/2014 | Yew | G02B 23/2484 600/476 |
| 2016/0341945 | A1* | 11/2016 | Ou | G02B 21/0048 |
| 2019/0339207 | A1* | 11/2019 | Finn | B25J 19/027 |

FOREIGN PATENT DOCUMENTS

| | | | | |
|---|---|---|---|---|
| JP | 2006220667 | A * | 8/2006 | ............. G01N 21/94 |
| JP | 6009288 | B2 * | 10/2016 | |
| KR | 101493838 | B1 * | 2/2015 | |
| WO | WO-2004073501 | A2 * | 9/2004 | ........... A61B 5/0066 |
| WO | WO-2008066798 | A1 * | 6/2008 | ........... G01B 11/161 |
| WO | WO-2013034429 | A1 * | 3/2013 | ......... A61B 1/00188 |
| WO | WO-2015164540 | A1 * | 10/2015 | ......... G01N 21/8851 |
| WO | WO-2018102467 | A1 * | 6/2018 | ............ G01J 3/0218 |

* cited by examiner

FAST IMAGE ACQUISITION SYSTEM AND METHOD USING PULSED LIGHT ILLUMINATION AND SAMPLE SCANNING TO CAPTURE OPTICAL MICROGRAPHS WITH SUB-MICRON FEATURES

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for optical inspection of various components, workpieces and optics, and more particularly to an optical inspection system and method which makes use of controlled, short duration light pulses to help capture clear, high resolution micrographs of a component, workpiece or optic, and without the need to repeatedly stop movement of the component, workpiece or optic while each micrograph is being captured.

BACKGROUND

The statements in this section merely provide background information related to the present disclosure and may not constitute prior art.

In order to achieve a high power laser system, high laser damage performance optics are a key component. In order to make high laser damage performance optics, one needs to know what causes the damage. Based on calculations, the size of damage precursors are often on the order of 100 nm. In order to capture these submicron sized features using an optical microscope, high numerical aperture ("N.A.") (>~0.6) objective lenses are suggested. Currently, optical micrographs are captured using medium N.A. (~0.35) objective lenses, which are not sufficiently sensitive to capture the sub-micron sized features. Yet, even with high N.A. objectives, these small features are often sparsely distributed over the area of an optic. As such, this requires the inspection of a large area, relative to the size of the features that one is attempting to detect.

One conventional method for capturing a plurality of images from large area samples involves taking an image of a portion of the sample, moving the sample to a new location, taking another image of a different portion of the sample, and repeating this sequence until a plurality of images (often a large of plurality of hundreds or more) are obtained which cover all areas of the sample. Typically, using this conventional method, it may take an hour or more to acquire optical micrographs of even just a one square centimeter area, even with a medium N.A. objective (~0.35). With this conventional inspection method, and using a medium N.A. objective, the detection of sub-micron scale features is simply not possible. To enable detection of sub-micron features, high N.A. objective lenses are suggested which, however, lead to substantially longer time to image the same area.

Hence, it would be highly valuable to be able to obtain sub-micron resolution optical micrographs so that sparsely distributed sub-micron features, which may be distributed over a large area, are captured within a reasonably short time frame. This capability would help address the challenge of identifying the stochastic damage precursor, and potentially enable the user of even higher power laser systems. For industry, this capability of more rapidly identifying sub-micron features on a sample, in a significantly shorter period of time, is expected to reduce costs by substantially reducing the time for large area optical inspection operations. This would be extremely beneficial in a number of industries, and particularly with semiconductor manufacturing operations.

In order to detect sub-micron scale features, commercially available Transmission Electron Microscopy (TEM) or Scanning Electron Microscopy (SEM) instruments are used since electrons provide higher resolution than photons. However, these techniques have limitations. For TEM, samples should be thin enough (<500 nm) to transmit electrons, which requires complex sample preparation processes. Furthermore, with the TEM method, it is not practical to study the stochastic behavior (e.g., discrete laser damage), which requires inspection of a large sample area. For the SEM technique, there is the sample size limitation as well. Another significant limitation of the SEM technique is that it only captures surface features; sub-surface features cannot be detected.

Photoluminescence (PL) is another 2D optical mapping technique which can detect sub-micron features. However, the PL technique is usable only when the features being detected are PL sensitive.

In some applications, high resolution images of a large sample area are needed. One specific example where it is especially important to capture high resolution micrographs is with large area optics used in connection with lasers at the National Ignition Facility (NIF), which is operated by the Lawrence Livermore National Laboratory. High resolution micrographs are needed to locate sub-micron size damage precursors in the optics used with the NIF lasers. However, previously used imaging systems are not practical for capturing high resolution optical micrographs of large area optics (e.g., optics having a diameter of 2.0 inches or larger, such as 40 cm×40 cm) within a reasonable time frame.

SUMMARY

This section provides a general summary of the disclosure, and is not a comprehensive disclosure of its full scope or all of its features.

In one aspect the present disclosure relates to an optical inspection system for detecting sub-micron features on a sample component. The system may comprise a controller, a camera responsive to the controller for capturing images, an objective lens able to capture submicron scale features on the sample component, a pulsed light source and a camera. The pulsed light source generates light pulses. The camera is controlled to acquire images, using the objective lens, only while the pulsed light source is providing light pulses illuminating a portion of the sample component. Relative movement between the sample component and the objective lens is provided to enable at least one of a desired subportion or an entirety of the sample component to be scanned with the camera. In another aspect the present disclosure relates to an optical inspection system for detecting sub-micron features on a sample component. The system may comprise an electronic controller, a camera, an objective lens, a beam splitter, a pulsed light source and a stage. The camera may be responsive to the controller for capturing images, and may include an aperture. The objective lens is used in connection with the camera to capture submicron scale features on the sample component. The pulsed light source is controlled to generate light pulses each having a duration of no longer than one microsecond. The beam splitter directs light pulses at least one of having passed through the sample component, or having been reflected from the sample component, toward the aperture of the camera. The camera is controlled to acquire images, using the objective lens, only while the pulsed light source is providing light pulses illuminating a portion of the sample component. The stage supports the sample component, wherein at least one of the stage or the camera is moved to create relative movement between the sample component and the camera.

In still another aspect the present disclosure relates to a method for performing optical inspection of a sample component to detect sub-micron features associated with the sample. The method may comprise generating a plurality of light pulses directed at the sample, wherein each light pulse has a duration of no more than one microsecond. The method may also include directing the light pulses through an objective lens having a numerical aperture which provides a resolution sufficient to identify submicron features. The method may further include using a camera to image portions of the sample while at least a subplurality of the light pulses are being generated, and while the sample is being moved relative to the camera. The method may further include using the camera to create a plurality of images of subportions of the sample to reveal one or more submicron features associated with the sample.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 2b is an example of a micrograph obtained with a prior art system while the sample is moving and a continuous light signal is being applied, which illustrates the significant blur that is introduced which essentially eliminates detection of the feature shown in FIG. 2a;

DETAILED DESCRIPTION

Example embodiments will now be described more fully with reference to the accompanying drawings.

The present disclosure relates to various embodiments of a system and method for collecting a plurality of optical micrographs from a sample having a large surface area, in a substantially reduced time when compared to previously developed imaging systems. First, in order to take images from a large area, the sample may be translated using a movable stage. To capture images with high resolution, an objective lens with a high N.A. is located over the sample. To take optical micrographs, illumination is provided to illuminate at least a subportion of the surface area of the sample. Still images of subportions of the surface area of the sample are obtained while the sample is translated, and while at least subportions of the sample are illuminated with short duration light pulses. With this approach, high resolution images showing sub-micron features can be captured while the sample is continuously moving. Due the short time of illumination, images delivered to a camera are captured as clear, still images. The continuous movement of the sample, while images are captured "on the fly", enables a large plurality of micrographs to be obtained for a relatively large surface area within a time period that would not be possible with pre-existing imaging systems.

It will be appreciated that at the present time, in the National Ignition Facility (NIF), it takes about 1 full hour to image a single, two square centimeter sample using an objective lens with a N.A. of 0.35. The present system and method, using an unmodified, commercially available camera operating at 100 frames per second camera, can image the same area in about 10 seconds or less. The system and method of the present disclosure therefore scans a sample with a dramatically increased speed, and more particularly with an increase of about two orders of magnitude in speed (i.e., about 360 times faster). With the previously used imaging technology, and a N.A. of 0.35, sub-micron features are not captured. With previously used imaging technology making use of an objective lens having a higher N.A., sub-micron features can be captured, but the acquisition time for a ~1 cm² sample would be about 25 hours, which is not practical since a typical sample size may be about two inches in diameter or larger. However, the system and method of the present disclosure can image a 1 cm² sample in about four minutes, and with sub-micron resolution. Scans in even less time than this are achievable with resolution which is still better than previously used imaging systems.

Figure 1:
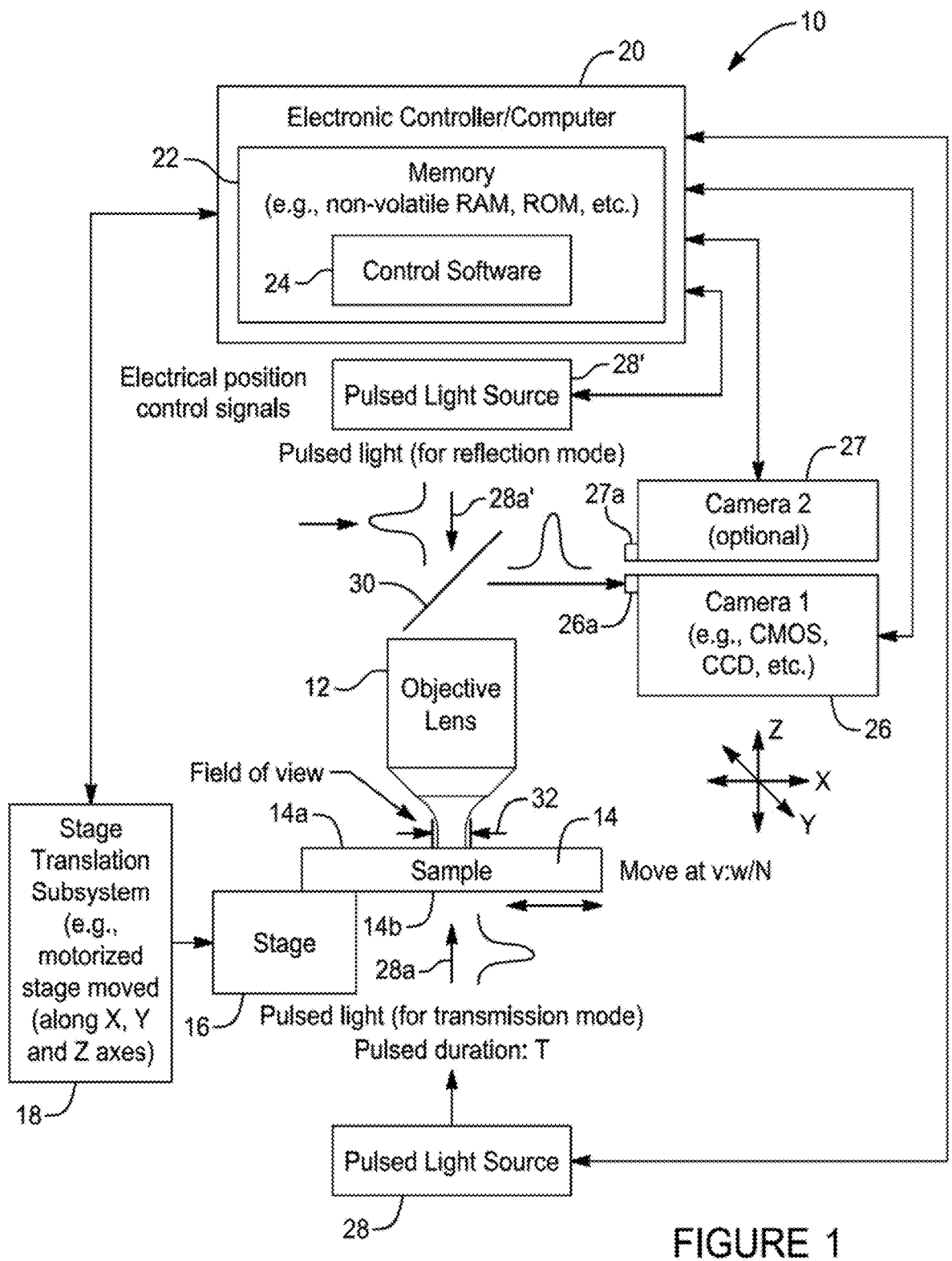
FIG. 1 is a high level block diagram of one embodiment of a system in accordance with the present disclosure for capturing high resolution micrographs.

One embodiment of an image acquisition system 10 in accordance with the present disclosure is illustrated in FIG. 1. A high magnification objective lens 12 is located over a sample component 14 (hereinafter simply "sample 14"). The objective lens may have a high numerical aperture (N.A.), for example preferably at least about 0.5 or higher, and more preferably about 0.6 or higher.

The sample 14 may be any form of workpiece or optical component where it is important to be able to identify submicron features or defects on a surface, or even inside, the sample. The sample 14 is supported on a stage 16 which is moved along X and Y axes (and optionally even along a Z axis) using a stage translation subsystem 18. In one specific implementation the stage translation subsystem 18 may be a motorized stage translation subsystem driven in accordance with electrical control signals, either in a closed loop or open loop control arrangement, applied to a suitable motor (e.g., DC stepper motor). The electrical position control signals may be generated by an electronic controller or computer 20, which for convenience will be referred to simply as "electronic controller 20". The electronic controller 20 may include a built-in memory 22, which alternatively may be an independent component which is accessible by the electronic controller 20. The memory 22 in one implementation is a non-volatile memory (e.g., RAM, ROM, etc.) and may contain control software 24 for generating the electrical position control signals used by the stage translation subsystem 18 for controlling motion of the stage 16, and thus motion of the sample 14 during scanning operations.

The electronic controller 20 is also in communication with at least one camera 26 having an aperture 26a for imaging the sample 14. The camera 26 may take several different forms, but in one example the camera 26 may be a CMOS sensing device or a charge coupled device ("CCD"). The electronic controller 20 may use its control software 24 to control "On" and "Off" operation of the camera 26. The electronic controller 20 may also be in communication with a pulsed light source 28, and may use the control software 24 to also control on/off operation of the camera 26 in synchronization with light pulses produced by the pulsed light source 28. In either event, the pulsed light source 28 creates a series of short duration light pulses 28a, typically on the order of less than about 1 µs in duration, and more preferably about 10 ns or shorter in duration, which are transmitted through the sample 14 in a "transmission mode" of operation, and which are synchronized with "On" and "Off" operation of the camera 26, to thus enable a series of images to be captured by the camera 26. The light pulses 28a may be re-directed by a beam splitter 30 into an aperture 26a of the camera 26. Optionally, a pulsed light source 28' may be located elevationally above the objective lens 12 if the pulsed light is being used in a "reflection mode" of operation. In the "reflection mode", the pulsed light 28a' is reflected from an upper surface 14a of the sample 14 and redirected by the beam splitter 30 back into the aperture 26a of the camera 26. The light pulse duration may be the same regardless if the transmission mode or the reflection mode of operation is used. With the transmission mode of operation, as noted above, the light pulses 28a pass through the full thickness of the sample 14, entering its lower surface 14b and exiting the upper surface 14a.

In another embodiment, both of the transmission and reflection modes are used. In this embodiment both of the light sources 28 and 28' are used. The camera 26 may capture the light from one of the light sources, for example from light source 28, while a second camera 27 having an aperture 27a is used to capture light from the other light source, for example reflected light from light source 28'. When the objective lens 12 is shared, light in both modes (reflection and transmission) can be taken at the same time. For this approach, the light pulses can be split by the beam splitter 30 and can be delivered to two beam paths (light pulses 28a on one beam path and light pulses 28a' on the other beam path). In this case, the light sources 28 and 28' operate at the same time.

Another embodiment contemplated by the present disclosure involves putting two objective lenses in separate locations, where each is associated with a separate pulsed light source and a separate camera. One objective lens, its associated pulsed light source and its associated camera, are form one subsystem which is used in the reflection mode. The second objective lens, its associated pulsed light source and associated camera, form a second subsystem which is used in the transmission mode. In this configuration, just the sample stage 16 is shared and the pulsed light sources can be operated at different times. The pair of cameras and the pair of pulsed light sources should also be synchronized in operation. This embodiment can offer additional flexibility. For example, a 50× objective lens+532 nm wavelength (pulsed light source) may be used for the transmission mode of operation, while a 100× objective+355 nm wavelength (pulsed light source) may be used for reflection (or photo luminescence images).

Figure 2B:
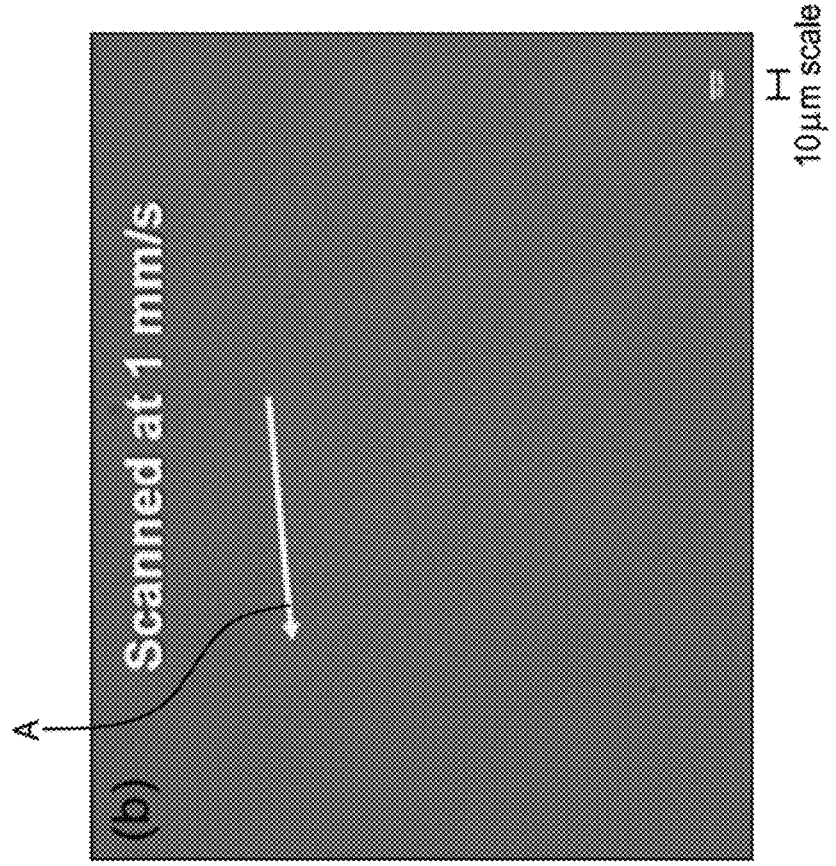
Figure 2A:
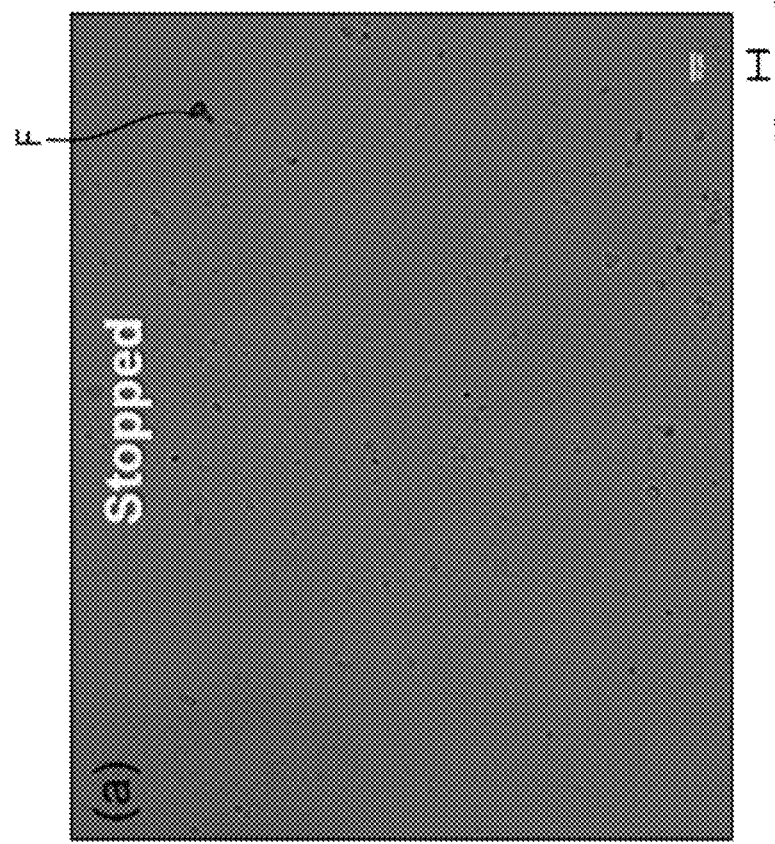
FIG. 2a is an example of a micrograph captured using a prior art system while the sample is held stationary, and illustrating that a specific feature is clearly identifiable.

As illustrated by arrows 32 in FIG. 1, a field of view, which is the area that the objective lens 12 can see or image, is smaller than the sample 14 size. Therefore, in order to see/take micrographs from a large sample area, the sample 14 is scanned/translated in the X and Y planes using the stage translation subsystem 18. With previously developed systems, in order to capture optical image information from the region of interest, image acquisition is required through the objective lens 12 (e.g., reflection mode) or through the sample 14 (e.g., transmission mode). Since optical image information is delivered to the camera 26 during the entire duration that illumination is being provided, if the sample 14 is moved/vibrated/shifted during the illumination time, the image information is also moved/vibrated/shifted, and therefore, the captured image is shown as blurred. For comparison, an image captured while the sample is perfectly stationary is shown in FIG. 2a, and the various features, such as feature "F" in FIG. 2a are clearly detected in the micrograph. But in FIG. 2b, the movement of the sample while an image is captured, and while a continuous illumination signal is provided, produces an image in which the features of the micrograph are significantly blurred, as indicated by the arrow "A" in FIG. 2b. In fact, virtually none of the features visible in FIG. 2a are visible in the micrograph of FIG. 2b. Therefore, in general, when a continuous light source (e.g., lamp) is used to take micrographs of a large area of a sample, movement of the sample is stopped for a short time period before capturing the image, to avoid any vibration from the previous scanning. This is because, the shift of the sample during the illumination is proportional to the scanning speed (v) * the illumination time or exposure time (T). Therefore, such a result is not acceptable for obtaining still micrographs on a 10 µm scale because the resulting micrograph will be blurred.

With the system 10, however, when a nanosecond duration light pulse from one of the light sources 28 or 28' is used, (e.g., $\tau=10$ ns) to provide the illumination, and the camera 26 is controlled to capture the micrograph during the short illumination duration, the resulting shift is only 10 nm (i.e., $1 \times 10^{-8}$ m), even when the sample 14 is scanned at v=1 meter per second. In other words, when a short light pulse of a nanosecond scale is used for illumination, a large area sample can be taken in a substantially reduced time with excellent image quality (i.e., where there is no noticeable shift in the sub-micron scale) because of the ability to capture clear, non-blurred micrographs without having to stop movement of the sample 14 prior to, and during, capture of each scan (i.e., each micrograph).

Figure 3C:
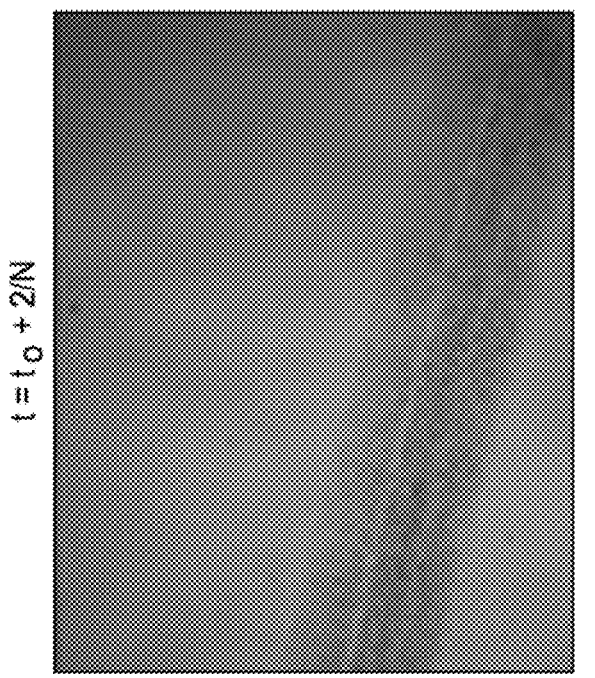
FIGS. 3a, 3b and 3c are illustrations of three micrographs obtained at three successive periods in time using the system and method of the present disclosure, which illustrates the high resolution and clarity of each image, and a slight degree of overlap between the three images which is useful when stitching the images together to form a larger, composite image.
Figure 3B:
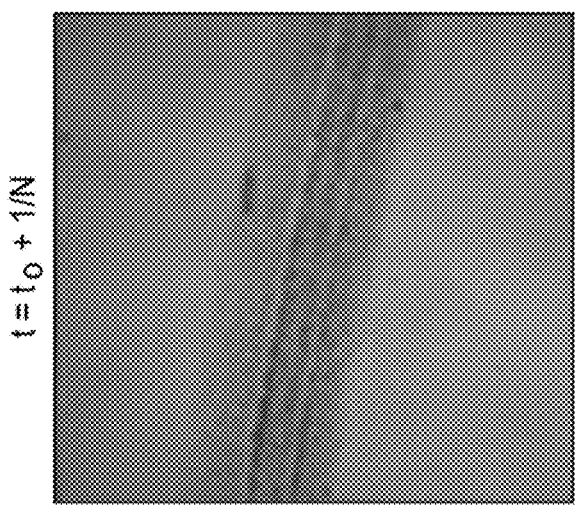
Figure 3A:
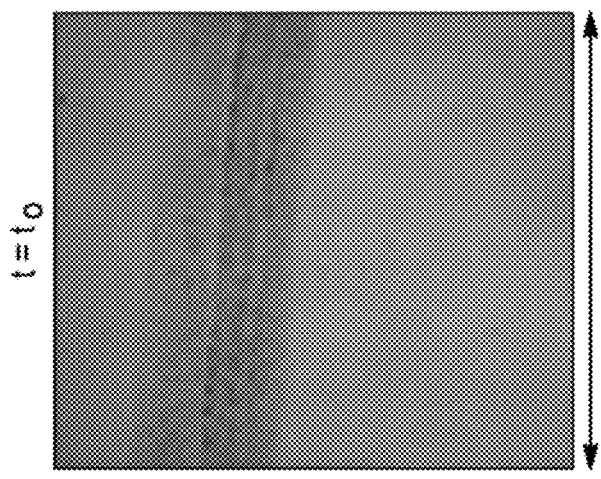

FIGS. 3a-3c illustrate three successive micrographs obtained using the system 10 of the sample 14, with the micrograph first obtained at $t=t_0$, (FIG. 3a), the second obtained at $t=t_0+1/N$ (FIG. 3b), and the third obtained at $t=t_0+2/N$ (FIG. 3c). For example, with a typical prior art system making use of a typical CCD exposure time of about 10 milliseconds (with some variation for how bright the continuous light source is), and with a scanning speed of 1 mm/s (i.e., $1\times10^{-3}$ meter per second), it was found that the resulting images are significantly blurred in the 10 μm scale. On the contrary, when using the system 10 with the same parameter (i.e., scanning speed of 1 mm/second), but with the pulsed light source 28 with a pulse duration of 10 ns, the blur is 0.01 nm (1 mm/sec×10 ns), which is virtually zero. The clarity of the images obtained using the system with this pulse duration of 10 ns can be seen in FIGS. 3a-3c, which also evidence a small degree of overlap which is useful for stitching the images together to form a larger composite image.

Figure 4B:
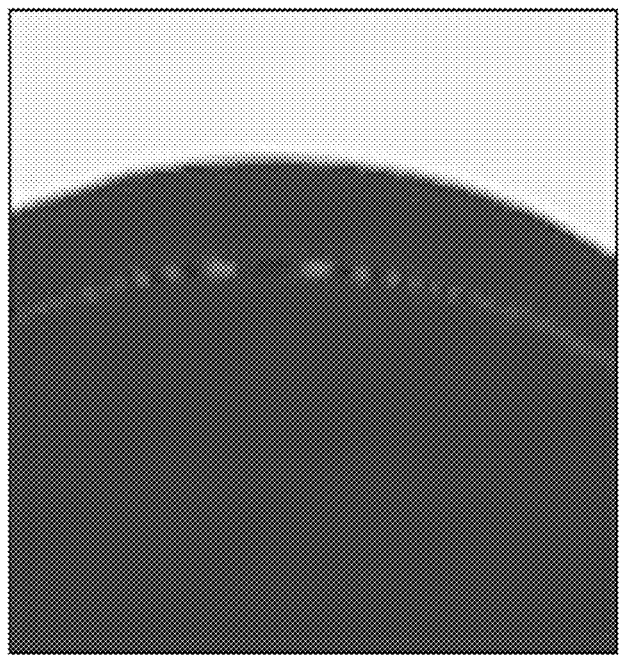
FIG. 4b is a diagram illustrating the shift occurring during a light pulse, when using the present system and method, is equal to the velocity of movement of the sample multiplied by the time duration of the light pulse being used.
Figure 4A:
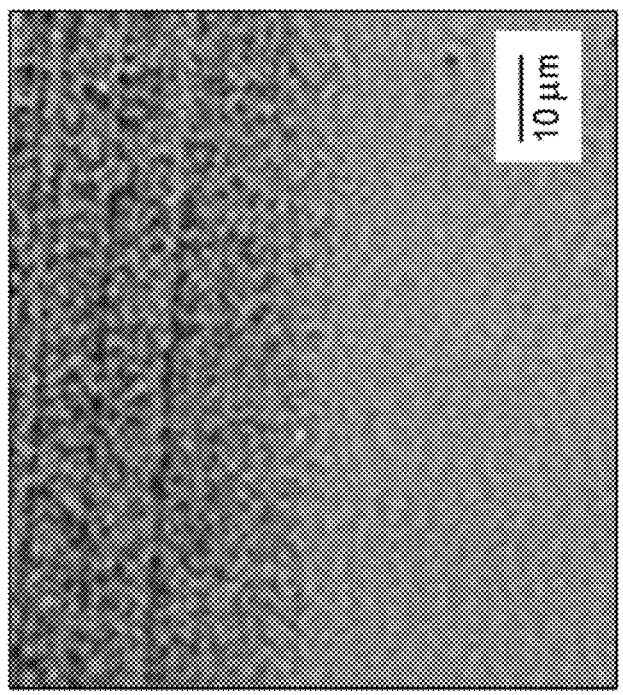
FIG. 4a is an enlarged illustration of a micrograph obtained using the present system and method to help illustrate that a degree of image shift does not affect the quality and resolution of the obtained micrograph.

FIG. 4a illustrates a single micrograph taken under the above conditions (i.e., 1 meter per second sample 14 movement and light pulse of 10 ns), where the features on the sample 14 are clearly delineated even in spite of movement of the sample. FIG. 4b is a diagram which helps to illustrate that the shift is related to the velocity of movement of the sample 14 multiplied by the time duration of the light pulse used (T).

Figure 5B:
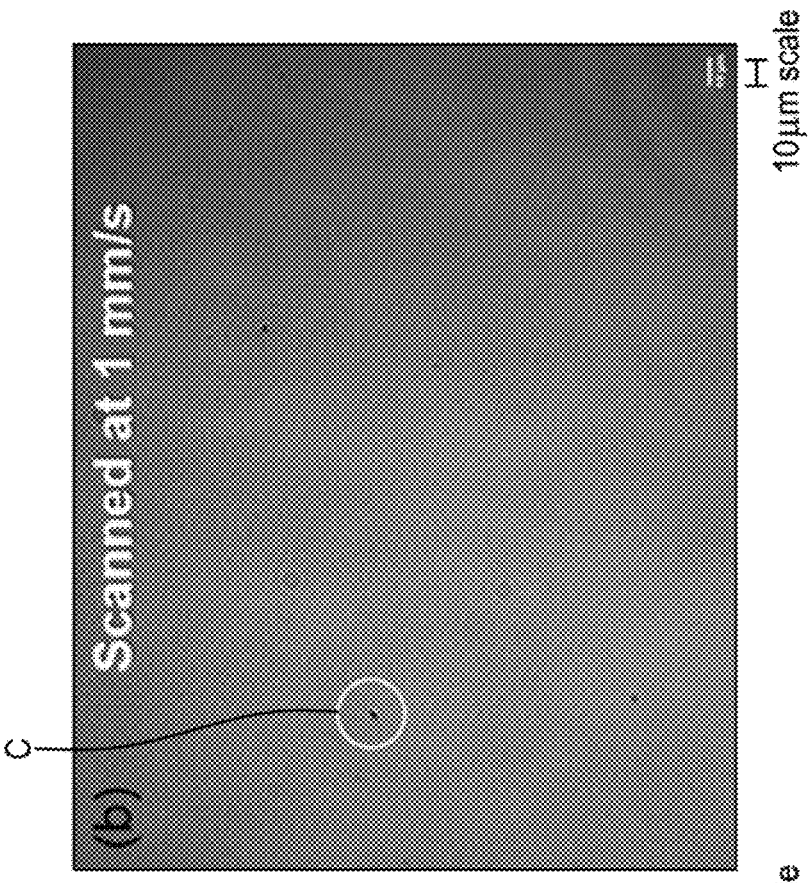
FIGS. 5a and 5b illustrate a degree of movement of a specific visible feature on the sample from a first image capture (FIG. 5b) of the sample to a second image capture (FIG. 5a) of the sample, when the velocity of movement of the sample is 1 mm/s.
Figure 5A:
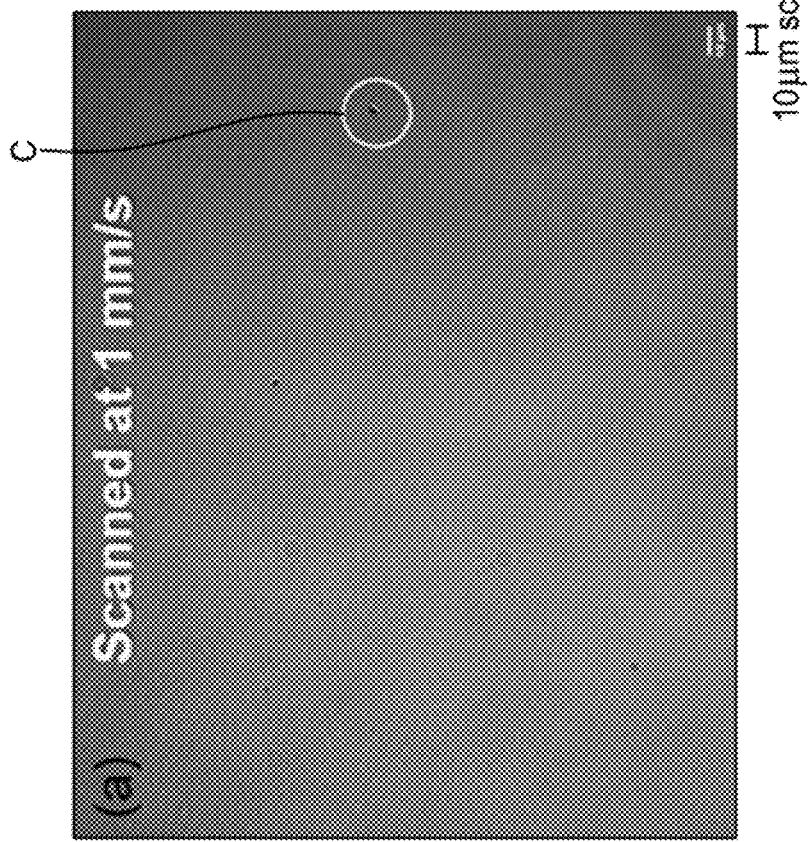

FIGS. 5a and 5b illustrate optical micrographs taken under a pulsed light using the system 10, while the sample 14 was translated at 1 mm/s. In this example, the micrograph of FIG. 5a was taken 100 ms after the micrograph of FIG. 5b. The scale is 10 μm. A particle circled with circle "C" in FIG. 5b has moved 100 μm since the scanning speed was set to 1 mm/s. The micrographs shown in FIGS. 5a and 5b were obtained using the transmission mode. The sub-micron feature identified by circle C is detectable by the system 10 when a 50× objective lens (e.g., objective lens 12) is used.

Figure 6:
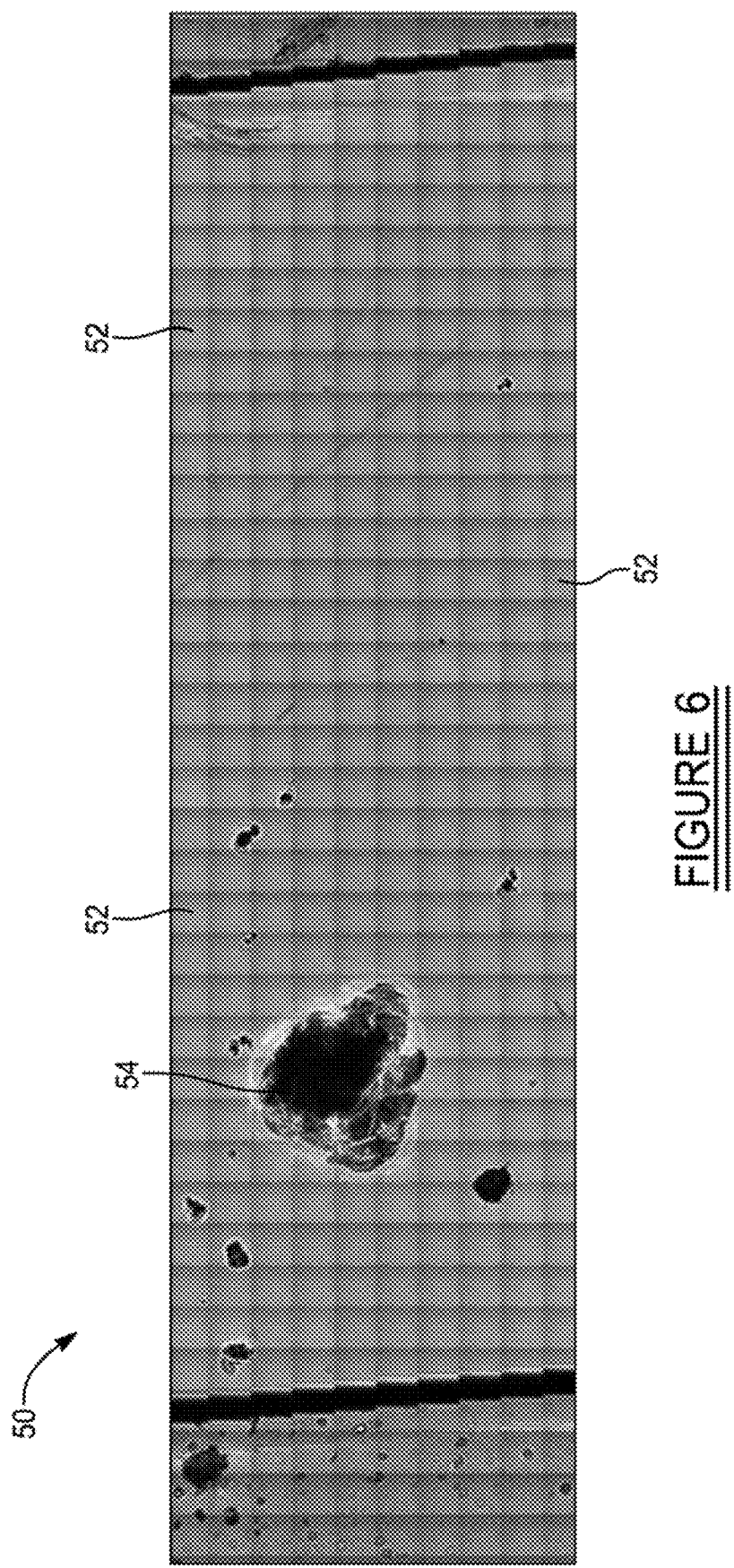
FIG. 6 illustrates a composite image created from a large plurality of individual micrographs obtained using the system and method of the present disclosure, where each square "tile" in this example is a separate micrograph having dimensions of 200 µm×200 µm.

FIG. 6 shows a stitched image 50 collected of the sample 14 using the system 10. Each square grid or "tile" 52 represents a separate micrograph having dimensions of 200 μm×200 μm. Specific features, such as feature 54, are formed over a plurality of contiguous micrographs once the stitching is accomplished. The overall stitched image 50 can be obtained in a small fraction of the time that would otherwise be required with previous systems that require repeatedly stopping and starting movement of the stage during the image acquisition process, and each of the micrographs have excellent clarity.

In summary, an important feature of each of the various embodiments of the present disclosure is the use of light sources which produce ultrashort duration light pulses, rather than continuous light sources. By replacing the continuous illumination of a light source used with previously developed image acquisition systems, along with the important needed changes to enable synchronizing operation of the camera with the ultrashort duration light pulses, the present disclosure can be employed to take high resolution micrographs without stopping movement of the sample 14. For preliminary data, the images shown in FIGS. 4a, 5a, 5b and 6, were taken with a commercially available pulsed, nanosecond light source. Such light sources are available from a number of sources. One suitable, commercially available light source is the Superk Compact Supercontinuum Laser, available from NKT Photonics, Inc. of Portland, which is a pulsed white light source which can be operated at a repetition rate=1 to 20 kHz, and with a pulse duration<2 ns).

The stage 16 and the stage translation subsystem 18 are also commercially available components. One such source of a suitable motorized stage is Aerotech, Inc. of Pittsburgh, Pa., available as model PlanarDL-200XY, which has a maximum speed of movement of 750 mm/s and a travel length of 200 mm. The objective lens 12 is also a commercially available component. The micrographs illustrated in the present disclosure were obtained with a 50× objective lens from Mitutoyo Corp. of Takatsu-ku, Kawasaki, Kanagawa, Japan, which has a N.A. of 0.55 and a working distance of about 13 mm. One camera that may be used with the system 10 is a CCD device available from Thorlabs, Inc. of Newton, N.J., as model DCU224C, which has a max capture rate (i.e., frame rate) of 15 frames per second (15 fps). For experiments with the system 10, the capture rate was set to N=10 Hz for the camera 26 and the light source 28, and the scanning speed was set to 1 mm/s. The images (FIGS. 4a, 5a and 5b, as well as the micrographs used to construct the image 50 of FIG. 6) were captured every 100 ms (1/N) while the sample 14 was scanned. The raw image captured of each micrograph in FIGS. 5a, 5b and 5c is 291 μm×233 μm, and there are overlaps between images, which can be used when stitching the individual images together to make a larger, composite image.

Figure 7:
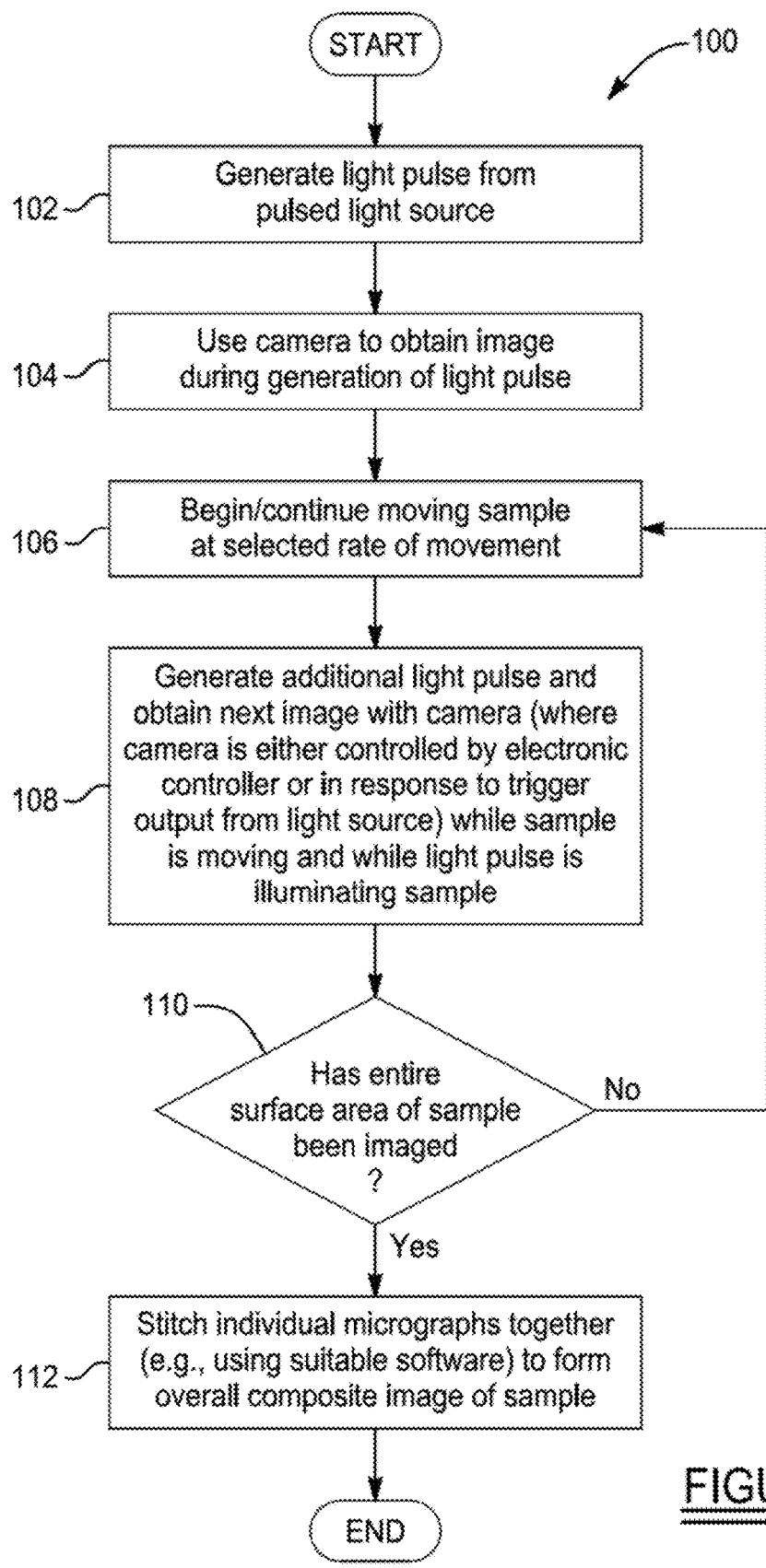
FIG. 7 is a high level flow chart illustrating various operations that may be performed using the methodology of the present disclosure to create a composite image from a plurality of independent, high resolution micrographs, such as that shown in FIG. 6.

Referring to FIG. 7, a high level flowchart 100 is shown illustrating various operations that may be performed using the system 10. At operation 102 a light pulse of suitable duration (e.g., nanoscale duration pulse) is generated from the light source 28 (or 28'). At operation 104, the camera 26 may be used to obtain an initial image during generation of the light pulse. At this point the sample may be stationary or may even be moving. The electronic controller 20 may control the camera 26 (and/or camera 27) to acquire the image(s) at precisely the time that the light source 28 (or pulsed light source 28') is/are being fired to emit a light pulse. The electronic controller 20 may control the camera 26 (and/or camera 27) in an open loop fashion, in accordance with a programmed pulse sequence of predetermined "On" and "Off" time durations. Alternatively, the electronic controller 20 may use a closed loop control arrangement with feedback provided back from the camera 26 and/or the pulsed light source 28 (or pulsed light source 28') to the electronic controller 20, to achieve an even greater degree of control over the image acquisition operation. Still further, the electronic controller 20 may be responsive to a triggered output from the pulsed light source 28 (and/or pulsed light source 28') which tells the electronic controller when the pulsed light source is being fired so the electronic controller is able to control the camera 26 (and/or camera 27) to acquire an image at exactly the proper time. All of the above control methodologies are considered to be within the scope of the present disclosure, and the electronic controller 20 is not limited to use with any one of these control schemes.

The electronic controller 20 may also control the stage translation subsystem 18 to control movement of the sample 14 at the desired rate of movement. Optionally, the stage translation subsystem 18 may be controlled by a separate controller, in which case the separate controller may (or may not) also be in communication with the electronic controller 20. Movement of the sample 14 may be controlled in a raster scanning pattern (i.e., linear, back and forth pattern), or in any other desired pattern, which may depend in part on the shape of the sample 14 being inspected. At operation 106 movement of the sample 14 may be initiated, or may continue, at a selected rate of movement. The selected rate of movement may vary significantly, and may be based at least in part on the duration of the light pulses being used. Scanning speeds may be determined at least in part by a capture rate of the camera being used (capture rate=N), as well as a field of view of the objective lens being used (field of view=w), and where a maximum scanning speed (v)=w/N (shown in FIG. 1). If the scanning speed is slower than v, then there will be overlapped regions in images.

At operation 108 the camera 26 is controlled by the controller 20 to obtain another image while the light source 28 (or 28') is illuminating the sample 14 and while the sample is moving. At operation 110 a check may be made to determine if the entire sample 14 has been scanned. If this check produces a "No" answer, then operations 106-110 may be repeated until the check at operation 110 produces a "Yes" answer. When this occurs, at operation 112 the collected images (i.e., micrographs) may optionally be stitched together to form a composite image by suitable stitching software. Such stitching software is widely commercially available. One example of suitable stitching software is ImageJ, which is an open source Java image processing program.

The system 10 and method of the present disclosure thus enables clear, excellent quality micrographs to be obtained in dramatically reduced times for any sample size. The larger the sample being imaged, the greater the time savings which will be realized when using the system 10. The system 10 can be implemented using widely commercially available components. The system 10 and its methodology are also readily implementable in Photoluminescence (PL) 2D mapping systems, when the need is to detect specific features that are PL sensitive. The system 10 is also expected to find significant utility in semiconductor manufacturing applications and in any application where examination and identification of sub-micron scale features on a workpiece, component or optic is needed for evaluation or quality study purposes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An optical inspection system for detecting sub-micron features on a sample component, the system comprising:
a controller;
a camera responsive to the controller for capturing images;
an objective lens able to capture submicron scale features on the sample component;
a pulsed light source which generates light pulses through the objective lens, wherein each said light pulse has a duration of no more than one microsecond; and
operation of the camera being synchronized with operation of the pulsed light source such that the camera is controlled to acquire images, using the objective lens, during a time interval while the pulsed light source is providing light pulses illuminating a portion of the sample component, with the light pulses travelling through the objective lens and being received by the camera to create the images captured by the camera; and wherein continuous relative lateral movement between the sample component and the objective lens is provided at a speed correlated in part on a specific selected value for the duration of each said light pulse, while the light pulses are being generated, to enable at least one of a desired subportion or an entirety of the sample component to be scanned with the camera.

2. The system of claim 1, wherein the pulsed light source provides light pulses each having a duration of no longer than 10 ns.

3. The system of claim 1, further comprising a movable stage for supporting the sample component and enabling movement of the sample component relative to the camera.

4. The system of claim 3, wherein the movable stage comprises a motorized stage.

5. The system of claim 1, wherein the objective lens comprises a numerical aperture of at least 0.5.

6. The system of claim 1, wherein the camera is turned on and off in accordance with a frequency of between 1 Hz and 20 kHz.

7. The system of claim 1, further wherein the system includes software for stitching separate images together to form a larger composite image.

8. The system of claim 1, further comprising a beam splitter for directing the light pulses from the pulsed light source toward an aperture of the camera after the light pulses have passed through the sample component, while the camera is turned on to capture an image.

9. The system of claim 1, further comprising a beam splitter for redirecting light pulses reflecting off of the sample component back toward an aperture of the camera while the camera is turned on to capture an image.

10. An optical inspection system for detecting sub-micron features on a sample component, the system comprising:
    an electronic controller;
    a camera responsive to the controller for capturing images, the camera including an aperture;
    an objective lens able to capture submicron scale features on the sample component;
    a pulsed light source which is controlled to generate light pulses each having a duration of no longer than one microsecond;
    a beam splitter for directing light pulses at least one of having passed through the sample component or having been reflected from the sample component, toward the aperture of the camera;
    operation of the camera being synchronized with the pulsed light source such that the camera is controlled to acquire images, using the objective lens, while the pulsed light source is providing light pulses illuminating a portion of the sample component, with the light pulses travelling through the objective lens and being received by the camera to create the images captured by the camera;
    a stage for supporting the sample component, wherein at least one of the stage or the camera is moved continuously laterally of the other in a plane while the light pulses are being generated, at a speed correlated in part on a specific selected value for the duration of the light pulses, to create continuous relative movement between the sample component and the camera while the images are being acquired; and
    stitching software for stitching the images together to form a larger composite image.

11. The system of claim 10, wherein the stage comprises a movable stage.

12. The system of claim 10, wherein the objective lens comprises an objective lens having a numerical aperture of at least 0.5.

13. The system of claim 10, wherein the light source is pulsed on at a frequency of between about 1 Hz to 20 kHz.

14. The system of claim 10, wherein the light source is pulsed on for a time duration of no longer than 10 ns.

15. The system of claim 10, wherein the camera comprises at least one of a CMOS device or a charge coupled device (CCD).

16. The system of claim 11, wherein the electronic controller controls movement of the stage.

17. A method for performing optical inspection of a sample component to detect sub-micron features associated with the sample, the method comprising:
    generating a plurality of light pulses directed at the sample, wherein each said light pulse has a duration of no more than one microsecond;
    directing the light pulses through an objective lens having a numerical aperture which provides a resolution sufficient to identify submicron features;
    synchronizing operation of a camera with the light pulses such that the camera is capturing images while the light pulses are being generated and while relative lateral planar movement is occurring between the sample and the objective lens at a speed correlated in part on a specific selected duration for the light pulses, and such that the light pulses pass through the objective lens after at least one of passing through or reflecting from the sample, and are received by the camera and used to create images of portions of the sample, and while continuous relative movement between the sample and the objective lens is occurring; and
    using the images of subportions of the sample to reveal one or more submicron features associated with the sample.

18. The method of claim 17, wherein the camera acquires the images in accordance with a frequency of from 1 Hz to 20 kHz.

19. The method of claim 17, wherein directing the light pulses through an objective lens comprises at least one of:
    directing the light pulses through a full thickness of the sample, and then through the objective lens; or
    directing the light pulses through the objective lens toward one surface of the sample, and then directing a reflected light pulse from the surface back through the objective lens.

* * * * *